March 3, 1970  H. H. TREMONT  3,498,071
APPARATUS AND PROCESS FOR FREEZING LIQUID IN A SECTION OF A PIPE
Filed Aug. 7, 1968  2 Sheets-Sheet 1
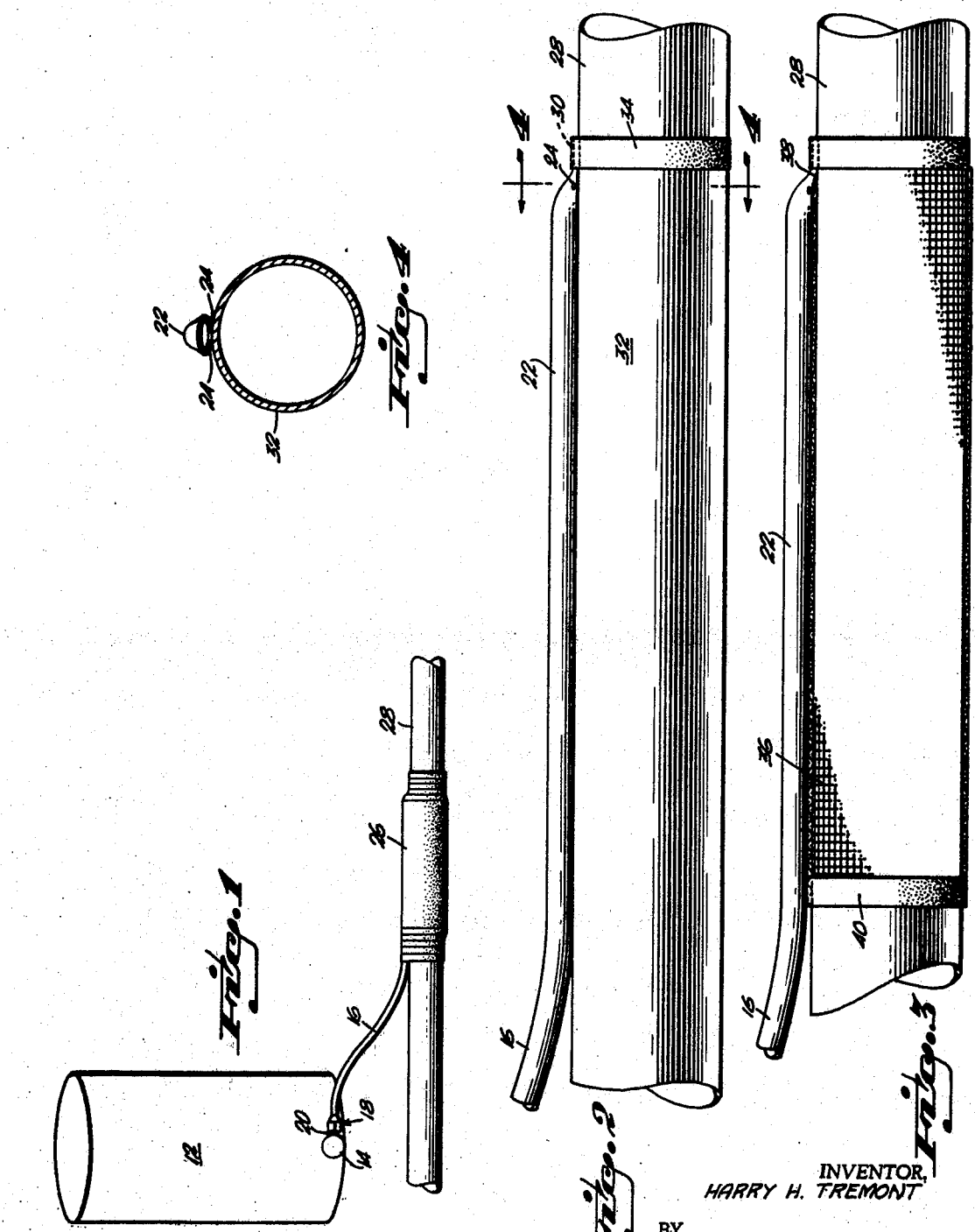
INVENTOR.
HARRY H. TREMONT
BY
John Cyril Malloy
ATTORNEY.

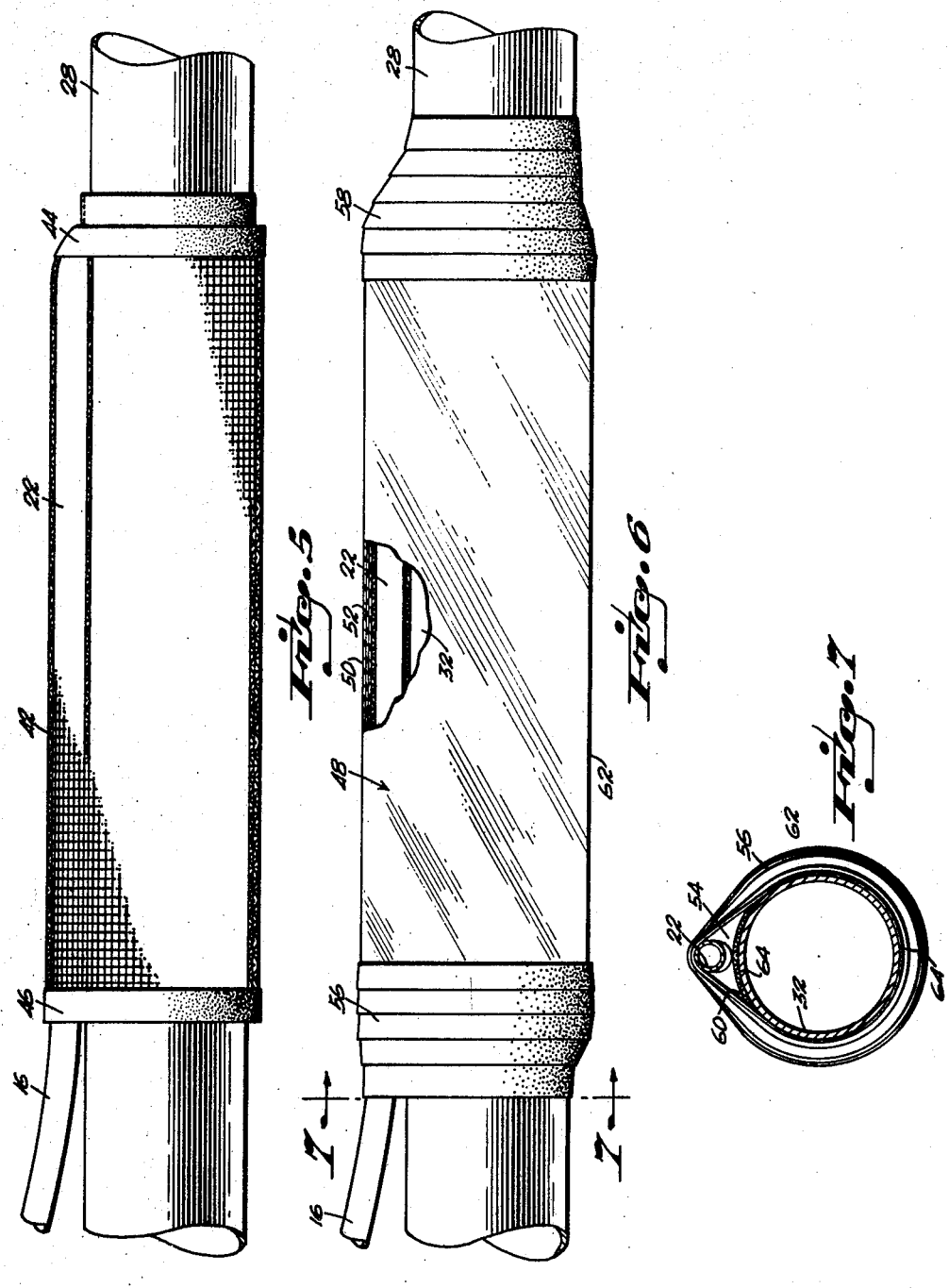

United States Patent Office 3,498,071
Patented Mar. 3, 1970

3,498,071
APPARATUS AND PROCESS FOR FREEZING
LIQUID IN A SECTION OF A PIPE
Harry H. Tremont, 6234 NW. Miami Place,
Miami, Fla. 33150
Filed Aug. 7, 1968, Ser. No. 750,893
Int. Cl. F16l 57/00; F25d 31/00; F28f 7/00
U.S. Cl. 62—66                            5 Claims

ABSTRACT OF THE DISCLOSURE

Apparatus and process for freezing liquid in a section of a pipe which includes placing a supply line leading from a container of liquified gas along a length of a a pipe in which fluid is flowing and jacketing the supply line in sealed relation about the section of the pipe so that the liquified gas may be caused to flow through the jacket to extract heat and rapidly freeze the section of the pipe.

---

This invention relates to an apparatus and process for quickly freezing liquid in a section of a pipe by the use of relatively inexpensive and light-weight materials which are adapted to be installed at a job site with a minimum amount of equipment. In the past, it has often been desirable to isolate a section of a fluid flow system to facilitate repair thereof without interference with the remainder of the system, such as a section of the floor of a hotel occupied by guests. Preferably, this is done by freezing a section of the system in series therewith. The present invention provides means and a process to rapidly freeze a section of a pipe to achieve this purpose. The means and process employs the utilization of a liquified gas maintained in a highly insulated or super cold container which is adapted to be metered or flowed to a sealed jacket circumposed about a pipe section containing fluid. The gas is of the type which includes liquified air which is relatively inexpensive or other gases which are known as cyrogenic fluids and inert gases, such as krypton, neon and nitrogen.

It is, accordingly, an object of this invention to provide a means and apparatus for supplying liquified gas to a sealed jacket circumposed about a section of a pipe to freeze liquid within the pipe which is adapted to be readily installed and used at a variety of locations.

It is another object of this invention to provide a process and apparatus for utilizing liquified gases contained in a highly insulated container and releasing the same through a supply line arranged along a length of a pipe and sealingly jacketed so that the liquified gas may be flowed through the jacket to freeze liquid in the pipe.

It is a general object of this invention to provide a process and apparatus for the utilization of super cold liquids in an inexpensive, highly portable and flexible manner to adapt the same for use in freezing a plug of fluid having a freezing point above approximately 5 degrees Kelvin in a pipe so that the downstream portion of the pipe may be isolated for repair.

It is another object of this invention to provide an improved process and apparatus for the purposes described which is simple and inexpensive to install in relation to a section of a pipe in a fluid flow system which includes jacketing means to jacket the pipe and a container of liquified gas with means to connect the container to the jacket interior and to distribute liquified gas metered from the supply container through the jacket to freeze fluid in the pipe.

In accordance with these and other objects which will become apparent hereinafter, the instant invention will now be described with reference to the accompanying drawings in which:

FIGURE 1 is a perspective view of the apparatus for freezing liquid in the section of the pipe shown;

FIGURES 2, 3, 5 and 6 are enlarged partial views of the jacketed portion of the pipe of FIGURE 1 and illustrate, respectively, the application of the apparatus to the pipe as follows:

In FIGURE 2, the supply line for the liquified gas is illustrated in overlaying relation along a length of the pipe section;

In FIGURE 3, a diffuser screen is shown intermediate the supply line and the pipe surface;

In FIGURE 5, a diffuser sleeve is shown in circumposed relation about the supply line and pipe section; and In FIGURE 6, the jacketed pipe is illustrated with the jacket being partially broken away to show the details of the construction;

FIGURE 4 is a view in cross section taken along the plane indicated by the line 4—4 of FIGURE 2 and looking in the direction of the arrows; and FIGURE 7 is a view in cross section taken along the plane indicated by the line 7—7 of FIGURE 6 and looking in the direction of the arrows.

Referring to the drawings, wherein like characters designate like or corresponding parts throughout the different views, there is shown in FIGURE 1 a supply container 12 which is heavily insulated and within which a supply of liquified gas is contained. The container 12 is provided with suitable venting means and control gauges and includes a supply valve 14. A supply line 16 is provided which includes means 18 comprising a fitting to connect to a nipple 20 on the valve in fluid-tight relation. The terminal end portion 22 of the supply line 16 is provided with discharge means 24 preferably comprising a plurality of orifices, and the supply line is preferably insulated along the main length thereof between the container and the end portion 22. The jacket 26 is provided along a section 28 of a pipe through which fluid flows and a construction of the jacket will now be described. The distal end 30 of the end portion 22 of the supply line is positioned at one end of the axially-extending length 32 of the pipe over which the end portion 22 is positioned; and the end portion is secured by suitable means, such as the band of tape 34. In the preferred embodiment, diffuser means of heat exchanging material, such as a sleeve 36 of flexible copper wire or other material characterized by a high coefficient of heat transfer, is provided in circumposed relation about the length 32 and intermediate the confronting surfaces of the end portion 22 and the length 32, one end of the sleeve nesting in the crotch 38 defined between the distal end 30 of the supply line and its securement to the pipe by the means 34, and the other end of the sleeve or diffuser being secured to the pipe by suitable means such as the band of tape 40.

Referring to FIGURE 5, an illustration of the preferred embodiment is seen which includes an outer sleeve or coil layer of the diffuser means of screen material, the outer layer 42 comprising a wrapping circumposed about and joining together the end portion 22 and the length 32. Suitable means, such as the tape means 44 and 46, are provided to interconnect the diffuser means through the length of the pipe. The means to jacket the end portion and the length of the section comprises a jacket 48 which is preferably composed of a plurality of layers 50 and 52 of flexible impermeable plastic material. As seen in FIGURE 6, the jacket is arranged so as to completely envelope the length including the preferred diffuser and the end portion 22 of the supply line with the exception of vent means 54, seen in FIGURE 7 in the upper portion of the jacket. Means to seal the jacket comprise a plurality of overlaying tape lengths 56 and 58 to secure the marginal ends of the jacket layers together and to the pipe.

In operation, the supply line from the container is attached to the length of a pipe section to be frozen and secured by the tape means. The wire screen is convoluted first about the length of the pipe and thence about the end portion of the supply line sandwiching the supply line between the screen and along the exterior length of the pipe in the section to be frozen. The section is then jacketed by wrapping flexible plastic sheet material around the end portion of the supply line, the pipe and the wire screen using at least one convolution of the plastic material for each ¼ inch of pipe diameter. The ends of the plastic jacket are sealed and a vent provided at the highest portion of the jacket. It will be noted that preferably the orifices are located at one end of the jacket and the vent means at the other so that when the supply valve is manipulated the liquified gas will course through the interior chamber 60 between the outer jacket surface 62 and the outer surface 64 of the pipe to extract heat and rapidly freeze the fluid flowing in the pipe. It will be apparent that although the pipe section 28 illustrated is shown in a horizontal attitude, the device may be utilized with equal effectiveness without the need of pumps to provide a frozen plug in a vertically-extending pipe section. It will be further apparent that by reason of the flexible materials utilized for the jacketing and diffusing, a wide variety of pipe shapes and sizes may be subjected to the operation and that locations which are difficult of access present no problem to the utilization of the process described above.

It is thus seen that this invention provides a process and apparatus to freeze fluid in a pipe which utilizes a heavily insulated supply vessel or container and a cryogenic fluid without exposure of the operator, and that the materials employed are flexible and adaptable for application to various sizes and shapes of pipes. The materials may be cut on the job or provided in predetermined kits to fit practically any situation expected to be encountered. The apparatus provides means to distribute the liquified gas either in a liquid or in a gaseous state within the jacket to effect a transfer of heat from the pipe and fluid with the diffuser screen uniformly distributing the heat transferred and tending to condense the liquified gas emitted from the orifice with the screen providing a large area in heat exchanging relation with the pipes to uniformly extract heat therefrom.

While the instant invention has been shown and described herein in what is conceived to be the most practical and preferred embodiment, it is recognized that departures may be made therefrom within the scope of the invention, which is, therefore, not to be limited to the details disclosed herein, but is to be accorded the full scope of the claims.

What is claimed is:

1. The process of freezing liquid in a section of a pipe comprising the steps of:
    placing the end portion of a supply line having an opening in the distal end in heat exchanging relation exteriorly along an axially extending length of the section,
    jacketing the supply line and the length of the pipe with a flexible impermeable material, and
    sealing said jacket with the distal end of said line within and near one end of said jacket, and with said line extending substantially along the jacket length and venting said jacket through the upper portion of the material at a location spaced from said distal end, and
    flowing liquified gas from a container through said line and said opening and into said jacket to freeze the section of said line, said liquified gas expanding into the gaseous state and removing heat from said section and said liquid before exit venting.

2. The process as set forth in claim 1 wherein the step of jacketing the supply line along the length of pipe comprising concentrally coiling an elongate sheet of plastic film about said pipe.

3. The process as set forth in claim 2 wherein said sealing comprises the step of taping the marginal edges of the coiled film together and to the pipe.

4. The process as set forth in claim 1 including the step of positioning a diffuser within said jacket to uniformly distributor the heat exchange to the gas.

5. The process as set forth in claim 4 wherein the step of positioning a diffuser comprises the step of forming a sleeve of flexible screen material characterized by a high coefficient of heat transfer within the jacket and in heat exchanging relation along and in contact with said supply line and said pipe.

References Cited

UNITED STATES PATENTS

| 2,483,082 | 9/1949 | Young et al. | 138—97 |
| 3,041,850 | 7/1962 | Nunn | 62—293 |

WILLIAM E. WAYNER, Primary Examiner

U.S. Cl. X.R.

62—293, 530; 137—315; 165—46